W. G. CHILTON & J. H. HOBGOOD.
ARMOR FOR PNEUMATIC TIRES.
APPLICATION FILED APR. 11, 1917.
1,243,040.
Patented Oct. 16, 1917.
2 SHEETS—SHEET 1.
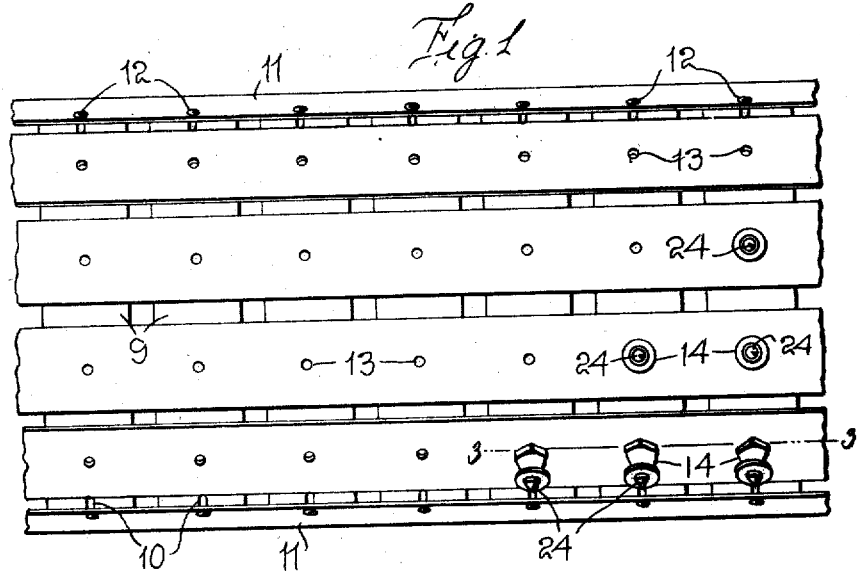
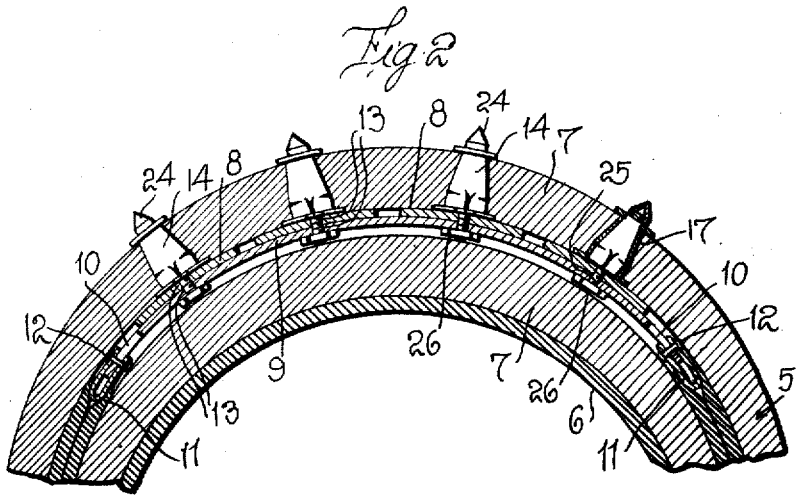
Inventors
W. G. Chilton
J. H. Hobgood
By Watson E. Coleman
Attorney W. G. CHILTON & J. H. HOBGOOD.
ARMOR FOR PNEUMATIC TIRES.
APPLICATION FILED APR. 11, 1917.
1,243,040.
Patented Oct. 16, 1917.
2 SHEETS—SHEET 2.
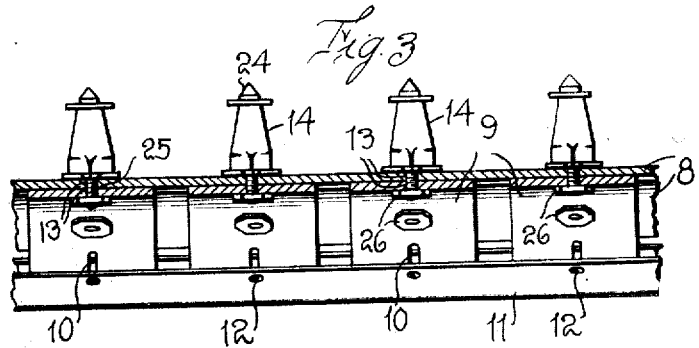
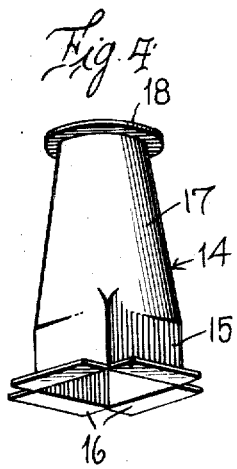
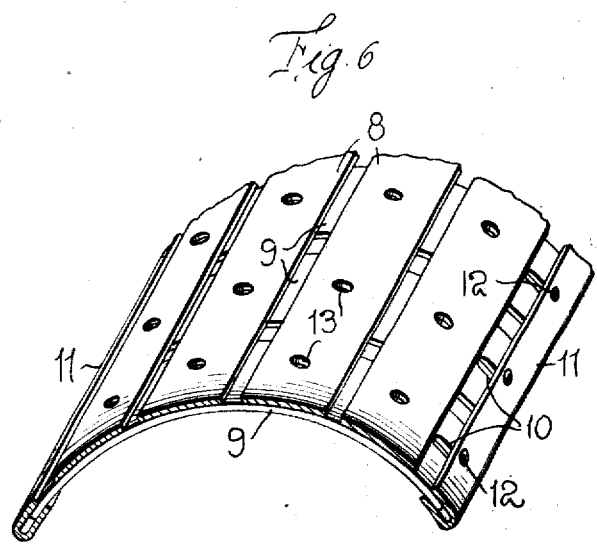
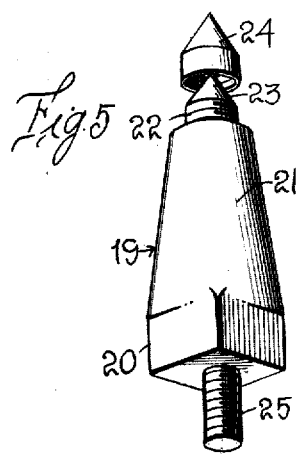
Inventors
W. G. CHILTON
+ J. H. HOBGOOD
By Watson E. Coleman
Attorney

UNITED STATES PATENT OFFICE.

WILLIAM G. CHILTON AND JOHN H. HOBGOOD, OF HOUSTON, TEXAS.

ARMOR FOR PNEUMATIC TIRES.

1,243,040.

Specification of Letters Patent. Patented Oct. 16, 1917.

Application filed April 11, 1917. Serial No. 161,317.

*To all whom it may concern:*

Be it known that we, WILLIAM G. CHILTON and JOHN H. HOBGOOD, citizens of the United States, residing at Houston, in the county of Harris and State of Texas, have invented certain new and useful Improvements in Armors for Pneumatic Tires, of which the following is a specification, reference being had to the accompanying drawings.

This invention relates to an improved armor for pneumatic tires and has for its primary object to provide simple and effective means for preventing puncture of the inner inflatable tube by the entrance of nails or other sharp objects through the tire casing.

It is also an additional object of the invention to provide anti-skidding lugs projecting from the periphery of the tire casing, and improved means for connecting said lugs to a flexible, metallic armor embodied in the casing structure.

It is also another important object of the invention to provide a renewable ground engaging tip or cap for the anti-skidding lugs.

The invention has for a still further object to provide a flexible armor of improved construction arranged between the layers of the tire casing which is light in weight, as well as highly effective for the intended purpose and will readily flex or give upon the application of external pressure to the casing.

It is also a general object of our invention to provide an armor device as above characterized, which consists of relatively few parts which may be readily embodied in the ordinary pneumatic tire casing without greatly increasing the manufacturing cost thereof.

With the above and other objects in view, our invention consists in the novel features of construction, combination and arrangement of parts to be hereinafter more fully described, claimed and illustrated in the accompanying drawings, in which, Figure 1 is a plan view of the flexible armor before it is embodied in the casing structure;

Fig. 2 is an enlarged transverse section through the casing provided with our improved armoring and anti-skidding means;

Fig. 3 is a section taken on the line 3—3 of Fig. 1;

Fig. 4 is an enlarged perspective view of the metal shell or casing of the anti-skidding lug;

Fig. 5 is a perspective view of one of the lugs and the detachable cap or tip therefor; and Fig. 6 is a fragmentary perspective view of the flexible armor.

Referring in detail to the drawings, 5 designates the body of the tire casing which incloses the pneumatic tube designated 6. It will be understood, of course, that the edges of the body walls of the casing are suitably formed to be detachably secured upon the rim of the wheel. The tread portion of the tire casing consists of two or more heavy layers of leather or other fibrous material 7, the inner tread also being secured upon the body wall of the tire casing in any preferred manner.

Between the two tread layers of the tire casing which, it will be understood, are continuous circumferentially of the casing, a flexible metal armor is arranged.

As shown more particularly in Fig. 1 of the drawings, the armor consists of a plurality of thin, resilient, longitudinally extending, metal plates 8 and a series of spaced, transversely curved, resilient metal plates 9 which are engaged upon the inner faces of the longitudinal plates 8. The ends of each transverse armor plate 9 are provided with elongated slots 10, and continuous channeled or U-shaped strips 11, of sheet metal, receive these slotted ends of the plates 9. Bolts indicated at 12 are disposed through the side walls of the channel-shaped strips 11 and the slots 10 in the transverse armor plates. Thus, it will be understood that the ends of these plates may move relative to the continuous connecting strips 11. The intersecting plates 8 and 9 are further provided with coinciding openings, as shown at 13, for a purpose which will be presently stated.

A plurality of metal shells or casings 14 are arranged in spaced relation and extend through openings in the outer tread layer 7 of the tire casing. These shells 14 are cemented or otherwise securely fixed to this tread layer of the casing and are provided with inner, rectangular end portions 15 having flanges 16 extending upon the inner face of the tread layer. The rectangular portion 15 is about one-third the length of the shell, the remaining portion thereof being of cylindrical, tapering form, as at 17, and also having an outwardly projecting, annular flange 18 on its end to extend over the outer face of the tread layer of the tire casing around the edge of the opening therein.

19 designates the anti-skidding lugs which are similar in form to the metal shell 17, each lug having a rectangular end portion 20 to fit within the portion 15 of the shell and also having a tapering body portion 21 which is provided with a reduced, threaded extension 22 terminating in a conical point or tip 23. A detachable, hollow cap 24 has an interiorly threaded portion at its larger end for engagement with the threads 22. Thus, when the point of the cap 24 becomes badly worn and blunted, it may be removed and a new cap readily applied to the end of the lug. The cap 24 also prevents axial shifting movement of the lug 19 in the shell 14. A reduced, threaded shank 25 also projects longitudinally from the square or rectangular end 20 of the lug and is adapted for engagement through the coinciding openings 13 of the armor plates 8 and 9. A thin, octagonal-shaped nut 26 is threaded upon the shank or extension 25 of the lug and tightened against the inner faces of the transverse armor plates 9. When the flexible metallic armor and the anti-skidding lugs have been applied to the outer tread layer of the tire casing in the manner just stated, said tread layer is suitably secured upon the inner tread layer 7 of the casing. The tire casing is now in condition for use upon the vehicle wheel.

From the foregoing description, it is believed that construction, manner of use, and several advantages of the invention will be clearly and fully understood. By arranging the anti-skidding lugs within the metal shells, said lugs are held against turning movement and all possibility of their disconnection from the metallic armor obviated. The caps 24 may also be very tightly threaded upon the projecting points 23 of the lugs, for which purpose the exterior faces of said caps at their internally threaded ends, are of polygonal shape. Any desired number of these anti-skidding lugs may, of course, be employed in connection with the flexible metal armor which is embodied in the tire casing, and the form or shape of the removable cap 24 for said lugs can also be varied if desired. The device as a whole is relatively simple in its construction and may be manufactured at relatively small cost.

By means of the invention, it will be appreciated that the penetration of nails or other sharp objects through the tire casing and the wall of the inner tube is effectually prevented, while at the same time the elasticity of the tire structure is not impaired.

While we have herein shown and described the preferred construction and arrangement of the several parts employed, it is to be understood that the device is susceptible of considerable modification therein and we, therefore, reserve the privilege of adopting all such legitimate changes as may be fairly embodied within the spirit and scope of the invention as claimed.

Having thus fully described our invention, what we desire to claim and secure by Letters Patent is:

1. The combination with a tire casing having superposed, flexible tread layers, of an armor consisting of intersecting, resilient metal plates disposed between the tread layers and extending longitudinally and transversely thereof, and annular members arranged between the tread layers to which the terminals of the transverse metal plates are slidably connected.

2. The combination with a tire-casing having superposed, flexible tread layers, of an armor consisting of intersecting, resilient metal plates disposed between the tread layers and extending longitudinally and transversely thereof, spaced annular members arranged between the tread layers, and pin and slot connections between the respective annular members and the corresponding terminals of the transverse metal plates.

3. The combination with a tire casing having superposed, flexible tread layers, of an armor consisting of intersecting, resilient metal plates disposed between the tread layers and extending longitudinally and transversely thereof, continuous annular members also arranged between the tread layers, lugs connected to said armor plates at their points of intersection and fastening the same together, said lugs extending through the outer tread layer and beyond the peripheral face thereof, spaced annular members of U-shaped form arranged between the tread layers, the terminal portions of the transverse armor plates being relatively movable between the opposed walls of the respective annular members.

4. The combination with a tire casing having superposed, flexible tread layers, of an armor consisting of intersecting, resilient metal plates disposed between the tread layers and extending longitudinally and transversely thereof, continuous annular members also arranged between the tread layers, lugs connected to said armor plates at their points of intersection and fastening the same together, said lugs extending through the outer tread layer and beyond the peripheral face thereof, annular members of channel-shaped form disposed between the tread layers, the corresponding terminals of the transverse armor plates being slotted and disposed between the spaced walls of said annual members, and pins fixed in the annular members and disposed through the slots in the armor plates.

5. The combination with a tire casing having inner and outer tread layers, of metal shells permanently fixed in the outer tread layer, anti-skidding lugs in said shells and projecting beyond the peripheral face of the tire casing and means for preventing axial movement of the lugs in said shells.

6. The combination with a tire casing having inner and outer flexible tread layers, of spaced metal shells permanently fixed in the outer tread layer of the casing and having rectangular portions, a lug disposed in each of said metal shells and having a rectangular portion fitting within the rectangular section of the shell, whereby the lug is held against turning movement, each of said lugs having a reduced terminal portion projecting beyond the peripheral face of the tire casing, and detachable ground engaging caps for the lug terminals.

7. The combination with a tire casing having inner and outer flexible tread layers, of spaced metal shells permanently fixed in the outer tread layer of the casing and having rectangular portions, a lug disposed in each of said metal shells and having a rectangular portion fitting within the rectangular section of the shell, whereby the lug is held against turning movement, each lug having a threaded shank on its inner end, a retaining nut engaged upon said shank, and detachable ground engaging caps for the lug terminals.

8. The combination with a tire casing having inner and outer flexible tread layers, of spaced metal shells permanently fixed in the outer tread layer of the casing and having rectangular portions, a lug disposed in each of said metal shells and having a rectangular portion fitting within the rectangular section of the shell, whereby the lug is held against turning movement, each of said lugs having a reduced threaded terminal projecting beyond the peripheral face of the tire casing, and a removable cap detachably engaged upon said threaded terminal.

In testimony whereof we hereunto affix our signatures in the presence of two witnesses.

WILLIAM G. CHILTON.
JOHN H. HOBGOOD.

Witnesses:
CHAMP ROSS,
CHAS. B. WOOD.